United States Patent
Marleau

(10) Patent No.: US 8,335,756 B2
(45) Date of Patent: Dec. 18, 2012

(54) SOFTWARE FOR FACET CLASSIFICATION AND INFORMATION MANAGEMENT

(75) Inventor: Yves Marleau, Gatineau (CA)

(73) Assignee: Cogniva Information Solutions Inc., Gatineau, Quebec (CA)

(*) Notice: Subject to any disclaimer, the term of this patent is extended or adjusted under 35 U.S.C. 154(b) by 737 days.

(21) Appl. No.: 12/520,328

(22) PCT Filed: Dec. 21, 2007

(86) PCT No.: PCT/CA2007/002356
§ 371 (c)(1),
(2), (4) Date: Jun. 19, 2009

(87) PCT Pub. No.: WO2008/074160
PCT Pub. Date: Jun. 26, 2008

(65) Prior Publication Data
US 2010/0036789 A1    Feb. 11, 2010

Related U.S. Application Data

(60) Provisional application No. 60/871,282, filed on Dec. 21, 2006.

(51) Int. Cl.
G06F 17/00 (2006.01)
G06N 5/02 (2006.01)
(52) U.S. Cl. ............................................... 706/47
(58) Field of Classification Search .............. 706/47
See application file for complete search history.

(56) References Cited

U.S. PATENT DOCUMENTS

| 5,544,360 A | 8/1996 | Lewak et al. |
| 7,010,607 B1* | 3/2006 | Bunton ................ 709/228 |
| 2003/0069908 A1* | 4/2003 | Anthony et al. ........... 707/513 |

(Continued)

FOREIGN PATENT DOCUMENTS

CA    2536179 A1    3/2005

OTHER PUBLICATIONS

Tudhope, D., Alani, H. and Jones, C. (2001) Augmenting thesaurus relationships: possibilities for retrieval. The Journal of Digital Information, 1, (8).*

(Continued)

*Primary Examiner* — Omar Fernandez Rivas
*Assistant Examiner* — Ababacar Seck
(74) *Attorney, Agent, or Firm* — Alexander Anishchenko; Borden Ladner Gervais LLP

(57) ABSTRACT

A semantic infrastructure (SI) system is provided to interface with an information asset management tool, such as a document management system. The SI is a semantic layer that links together structured, unstructured and tacit information. The SI determines a set of valid terms associated with remaining facets based on the term selection for a first facet and in accordance with predefined facet relationships. The present invention links the content of documents to an enterprise view and to a corporate file plan. The SI includes a database storing assets each associated with a plurality of facets. Embodiments of the present invention provide a unified approach, i.e., an approach that can provide file classification, taxonomies, metadata, thesauri and data model functionalities, to better describe and organize information assets using a single database employing a faceted classification system. A stored metadata instance is mapped to an externally supported metadata format.

24 Claims, 7 Drawing Sheets

U.S. PATENT DOCUMENTS

| | | | |
|---|---|---|---|
| 2003/0097357 A1* | 5/2003 | Ferrari et al. | 707/3 |
| 2005/0065955 A1* | 3/2005 | Babikov et al. | 707/101 |
| 2005/0108001 A1* | 5/2005 | Aarskog | 704/10 |
| 2007/0106658 A1* | 5/2007 | Ferrari et al. | 707/5 |
| 2007/0294312 A1* | 12/2007 | Seshadri et al. | 707/200 |
| 2008/0021925 A1* | 1/2008 | Sweeney | 707/104.1 |

OTHER PUBLICATIONS

PCT Patent Application No. PCT/CA2007/002356: International Search Report dated May 6, 2008.

"Coredge Logik—My Edition (version 3.0) Help Guide", (Coredge Software, Mar. 2005) online: Coredge Support <http://www.coredge.com/support/logik/PDF/Logik_Hlp.pdf>, 12 pages.

"Faceted Classification of Information" (The Knowledge Management Connection, Nov. 5, 2006), online: Faceted Classification <http://www.kmconnection.com/DOC100100.htm>, 7 pages.

Spiteri, "Design of an Instrument to Measure the Structural Quality of Faceted Thesauri", (PhD Thesis, University of Toronto Graduate Department of Information Studies, 1996, (online: Library and Archives Canada <http://www.collectionscanada.gc.ca/obj/s4/f2/dsk3/ftp04/NQ28167.pdf>), 6, pages.

Yee et al., "Faceted Metadata for Image Search and Browsing", (Paper presented to the CHI 2003, Apr. 2003), online: Flamenco <http://flamenco.berkeley.edu/papers/flamenco-chi03.pdf>, 14 pages.

Rao, "Information Flow #4", (Inxight Software, Aug. 2002), online: Facets and Multiple Angles of Access <http://www.ramanarao.com/informationflow/archive/2002-08.html>, 5 pages.

Marleau et al. "Faceted Classification in the Government of Canada: Towards a Global Approach to Information Architecture", (Presentation to the Information Architecture Summit 2005, Mar. 5, 2005), online: ASIS&T 2005 Information Architecture Summit <http://www.iasummit.org/2005/finalpapers/119_Presentation.ppt>, pp. 1-32.

* cited by examiner

| Context | | | | | | | Content | | | | Command | | |
|---|---|---|---|---|---|---|---|---|---|---|---|---|---|
| Function | R | D | S-Func | R | D | Activity | R | D | Topic | R | D | R | D | Result | Map |
| Func 8 | 7 | A | S-Func 3 | | | Activity 12 | | | Topic 4 | | | 7 | A | 7-A | 3498 |
| Func 1 | 3 | D | S-Func 6 | | | Activity 2 | | | Topic 13 | 8 | A | 8 | A | 8-A | 9812 |
| Func 4 | 5 | D | S-Func 2 | 6 | D | Activity 8 | 7 | D | Topic 20 | 8 | D | 8 | D | 8-D | 546 |
| Func 10 | 3 | D | S-Func 4 | 5 | D | Activity 34 | 5 | D | Topic 1 | 1 | A | 25 | A | 25-A | 12 |

Fig. 5

SOFTWARE FOR FACET CLASSIFICATION AND INFORMATION MANAGEMENT

CROSS REFERENCE TO RELATED APPLICATIONS

This application claims the benefit of priority of U.S. Provisional Patent Application No. 60/871,282 filed Dec. 21, 2006, which is incorporated herein by reference in its entirety.

FIELD OF THE INVENTION

The present invention relates generally to information management systems. More particularly, the present invention relates to information management systems using faceted classification.

BACKGROUND OF THE INVENTION

Information architecture (IA), or semantic infrastructure, can be seen as a blueprint defining how information is standardized, structured and organized. IA is an attempt to organize information in a way that it is findable, manageable and useful. In particular, it is a framework that assesses, describes, and connects organizational information to its business process. Its objective is to identify and leverage patterns in data by making complex sets of information easier to exploit. By having an IA, organizations can better access, share, and consolidate their information holdings to support the needs of business processes and their management. However, in many organizations, the IA is often poorly designed or absent altogether.

Within an organization, several information management (IM) tools are often used independently from each other within an organization, to satisfy specific IM needs. Typically, file classification, taxonomies, metadata, thesauri and data models (i.e., data structures required by a database) each use their own independent databases to store data in various formats, with these databases not interacting with each other. The resulting isolated functionality often leads to a set of inconsistent, overlapping, and incompatible information systems that are difficult to maintain and often results in the creation of silos where information becomes stranded from potentially valuable organizational uses.

The use of multiple IM tools within an organization often leads to the coexistence of several standards restricted to specific IM needs. In some cases, groups within the organization develop their own standardization procedures or do not use a standard whatsoever. The absence of uniform and comprehensive IM standards creates an environment where information is inconsistent, difficult to access, and unreliable. Further, the lack of such standards often leads to the duplication of information to meet requirements of several different IM tools.

An information object (IO), or information asset, is defined as an object that has importance to an organization. Examples of IOs include all types of documents produced by software. Traditional IM tools do not afford rich descriptions regarding the aboutness of information objects. Using keywords, for instance, will not necessarily provide reliable descriptions because the interpretation of the terms used can often have various meanings in different contexts. Furthermore, organizational documents often discuss a specific topic without ever referring to it explicitly. This can lead to additional descriptive irregularities.

To add to the disorder, end-users are increasingly being required to manage their information holdings by performing specific IM tasks over and above their work related tasks. This often leads to poor metadata being attributed to IOs, which leads to user frustration, error and reduced productivity.

Additionally, in many cases, corporate IA is designed to meet the requirements of a specific software solution and, as a consequence, lacks the necessary flexibility to adapt to frequent technological changes.

It is, therefore, desirable to provide a more comprehensive and better-structured description of document content in order to allow a more effective and broad-ranged use of an organization's information objects while also making them easier to retrieve.

It is also desirable, within an IA, to have classification and metadata generation procedures that are intelligent in that they streamline a user's IM tasks while ensuring that information is accurately and efficiently managed.

Additionally, it is desirable to provide an IA that is independent of specific software solutions and allows the various technical systems to leverage benefits from the IA.

SUMMARY OF THE INVENTION

It is an object of the present invention to obviate or mitigate at least one disadvantage of previous information management systems and methods.

In a first aspect, the present invention provides a semantic infrastructure system for classifying an information asset. The system comprises: a facet storage module storing a plurality of facets, each facet having a set of classification terms; a facet selection and display engine having facet operators representing predefined relationships between classification terms in one facet and classification terms in another facet based on established valid term combinations, the facet selection and display engine to receive term selections and to determine valid terms for display from the facet storage module for each facet based on the received term selections in accordance with the facet operators; a metadata instance to store the term selections until asset classification is complete; and an integration module to map the stored metadata instance to an externally supported metadata format. The facet selection and display engine can iteratively determine valid terms for display from the facet storage module for each facet based on the received term selections in accordance with the facet operators. The system can further include a second integration module to map the stored metadata instance to a second externally supported metadata format.

According to embodiments, the system can further include a user interface controlled by the facet selection and display engine. The user interface can display the facets and terms as user-selectable elements. The facet storage module can include display terminology associated with underlying metadata. In that case, the facet selection and display engine can, for example using a thesaurus, display facets and terms in accordance with a mapping between the display terminology and the underlying metadata. The plurality of facets can include context facets determined based on an analysis of business processes and determined independently of information asset contents.

The facet storage module can include asset retention and disposition properties associated with classification terms. In that case, the facet selection and display engine can automatically associate the asset retention and disposition properties with the information asset in accordance with the term selection. The facet selection and display engine can include means to apply a contention rule to select one of a plurality of asset retention and disposition properties associated with selected terms.

The facet operators can be based on term inheritance derived from inheritance in each faceted classification. The facet operators can define bi-directional relationships between terms in one facet to terms in a plurality of other facets based on established valid term combinations.

In another aspect, the present invention provides an information asset management system including an external asset management tool interoperating with the semantic infrastructure system described above.

In a further aspect, the present invention provides a method of classifying an information asset according to a semantic infrastructure including the following steps: displaying a plurality of facets, each facet having a set of classification terms; receiving a term selection for a first facet from among a first set of classification terms associated with the first facet; determining a set of valid terms associated with remaining facets based on the term selection for the first facet and in accordance with predefined facet relationships; displaying the set of valid terms for further term selection; mapping selected terms to an externally supported metadata format.

In embodiment, the method can further include limiting the set of valid terms to those associated with the term selection for the first facet and the further term selection. The predefined facet relationships can be based on facet operators. Facets and terms can be displayed in accordance with a mapping, such as a thesaurus, between display terminology and underlying metadata. The method can further include establishing a relationship between a person and a subject based on context facets associated with the subject to represent tacit knowledge.

Displaying the plurality of facets can include displaying the set of classification terms for each of the plurality of facets as user-selectable elements, which can be displayed in a drop-down menu. Receiving the term selection can comprise receiving a user selection of one of the user-selectable elements. Alternatively, receiving the term selection can comprise deriving the term selection based on context information.

Displaying the set of classification terms can include displaying classification terms in the set of valid terms. The externally supported metadata format can be supported by an external asset management tool. Asset retention and disposition properties can be associated with at least one selected term, in which case the method can further include automatically associating the asset retention and disposition properties with the information asset. The method can further include applying a contention rule to select one of a plurality of asset retention and disposition properties associated with selected terms.

In a yet further aspect, the present invention provides a computer readable medium storing statements and instructions which, when executed, cause a processor to perform a method as described above.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 5 shows a screen shot illustrating exemplary retention and deletion functionalities of the information management system of the present invention;

DETAILED DESCRIPTION

Figure 1:
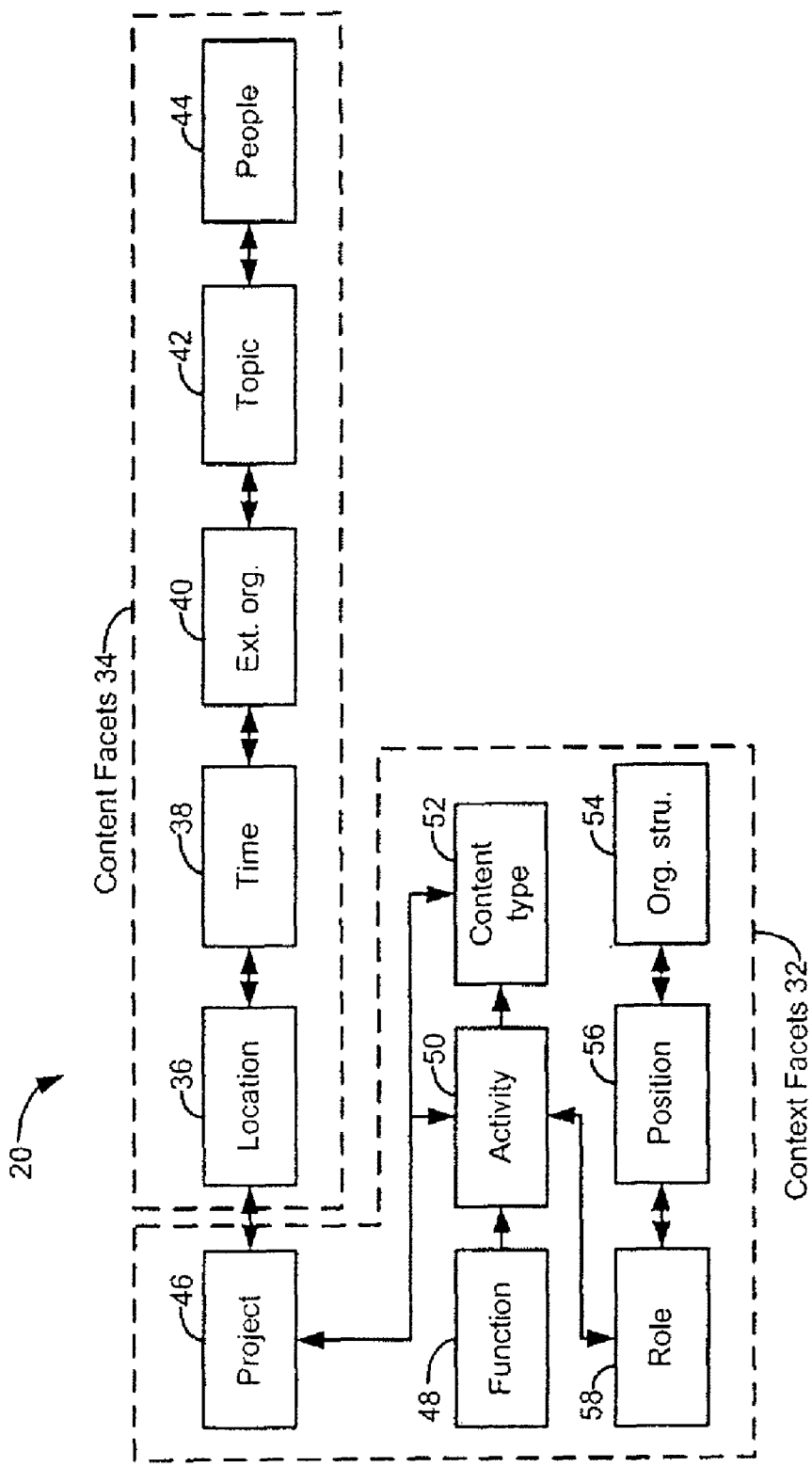
FIG. 1 shows inter-related context and content facets used to describe an information object in accordance with an embodiment of the present invention.

Generally, the present invention provides a semantic infrastructure (SI) to interface with an information asset management tool, such as a document management system (also referred to as a content tool). The SI is a semantic layer that links together structured, unstructured and tacit information. The present invention links the content of documents to an enterprise view (facets: role-position-organization) and to a corporate file plan (facets: function and activity) The SI includes a database storing assets each associated with a plurality of facets. Typically, file classification, taxonomies, metadata, thesauri and data models (i.e., data structures required by a database) have each used their own independent databases to store data in various formats, with these databases not interacting with each other. Embodiments of the present invention provide a unified approach, i.e., an approach that provides all the above-noted functionalities, to better describe and organize information assets using a single database employing a faceted classification system. Information assets are stored by the document management system with which the semantic infrastructure interfaces. Faceted metadata associated with information assets is stored in the semantic infrastructure system.

Each information object, or information facet, has associated context and/or content facets having a predetermined universe of values, or set of classification terms. The terms for the context facets are established based on knowledge of business characteristics and processes, and are established independently from the actual content of any information assets. The content facets are based on existing information assets. The classification metadata associated with information assets persists even when the information asset management tool is changed or removed.

Relationships between terms in different facets are stored in a multi-dimensional approach using facet operators to define valid term combinations. Each facet has a set of classification terms. Facet operators describe predefined, or pre-established, relationships between terms in one facet and terms in another facet based on established valid term combinations. The facet operators can be used to automatically derive a subset of valid terms in the other facet, such that only valid terms are presented or displayed based on one or more selections.

For example, suppose a term "Manager" is selected or determined for a first facet of "Role". The system then uses facet operators to only provide a limited scope of all other facet values, which are known to be associated with the first facet term "Manager". This ensures consistency in profiling assets, and also makes facet term selection easier during asset profiling by providing only valid values in a given context. The first facet upon which the automatic derivation is based can be any of the stored facets. Automatic derivation of valid terms can populate a facet if only one valid term exists.

The semantic infrastructure system (SI) of the present invention is provided as an enhancement to an existing information asset management tool, also referred to as a content tool, such as, for example, Microsoft Office™, OpenText™, and Hummingbird™. Modifications to the semantic infrastructure system can be made regardless of the underlying tool, and can propagate to a plurality of different tools with which the semantic infrastructure system communicates. As such, a database storing semantic infrastructure metadata can be used as a common language to sustain interoperability between different information management tools. Mapping the faceted metadata onto existing tools allows for the benefits of a faceted classification system to be implemented on non-faceted systems.

When entering/profiling an asset into the SI, a value is determined or selected for a first facet, which can be any of the stored facets. In response to establishing a first facet value, the facet classification system of the present invention provides a limited number of second facet values based on a stored association, or relationship, between the first facet value and the second facet values.

The SI can also be used to identify tacit knowledge within an organization. People can be associated as having knowledge related to various subjects described by the faceted system, even in the absence of any stored information assets associated to the people. A subjects can have associated context and/or content facets.

A metadata integration scheme of the present invention provides a model to support the translation of facets into a consistent metadata set. The model comprises metadata description and metadata application rules.

Once the semantic infrastructure system selects the appropriate faceted metadata, the faceted metadata is transferred to the content creation tool where the information asset is stored. Information assets can then be described in a consistent manner across all content creation tools.

Facet, or faceted, classification is at the basis of the information management system and method of the present invention. Facet classification allows the assignment of multiple classifications to an information asset, enabling the classifications to be ordered in multiple ways, rather than in a single, pre-determined, taxonomic order. Simply stated, facet classification is used as a way to describe an information object from many perspectives. Within a given system, facets can be seen as categories that clearly define mutually exclusive and collectively exhaustive aspects, properties, and/or characteristics of a class or specific subject. Facets provide a representation of a particular perspective that can be associated with an information asset.

At present, faceted classification is widely used in menu-driven navigation systems that enable a user to navigate information hierarchically, going from a category to its sub-categories, by choosing the order in which the categories are presented. This contrasts with traditional classification systems in which the hierarchy of categories is fixed and unchangeable. As an example, a restaurant guide using traditional classification might group restaurants first by location, then by type, price, rating, awards, ambiance, and amenities. In a faceted classification system, a user might decide first to divide the restaurants by price, and then by location and then by type, while another user could first sort the restaurants by type and then by star rating. Therefore, navigation through a facet classification system guides users by showing them available facets (or categories), but does not require the users to browse through a hierarchy that may not precisely suit their needs or way of thinking.

The present invention builds on the concept of faceted classification by establishing pre-determined relationships between possible values that can be taken by facets used in describing an IO.

FIG. 1 shows an exemplary information architecture (IA), or semantic infrastructure, of the present invention. The IA 20 includes context facets 32 and content facets 34. The relationships between the various facets are depicted by arrows. The context facets 32, content facets 34 and the interrelationships (arrows) define the IA in question. The IA 20 is used to represent information assets (also referred to as information objects (IO)) generated within the organization, e.g., a corporation, for which the IA 20 has been constructed. The manner in which IAs such as IA 20 are constructed is described below.

With reference to FIG. 1, typical content facets 34 can include, for example, a location 36 that specifies the geographical or environmental aspects of the IOs; a time 38 that specifies a period or a date to be included in the description of the IOs; an external organization 40 that is used to describe entities (e.g., other corporations or non-governmental organizations) interacting with an organization with respect to IOs; a topic 42 that describes the subject matter covered in the IO; a people 44 that designates the people identified by the occupation or activity, the physical or mental characteristics, or the social role or condition when an IO's topic refers to a group or category of persons The content facets 36-44 can be connected to the project 46 context facet, which refers to any suitable grouping of organizational resources created to pursue or fulfill a task. Examples of such resources include committees, initiatives, cases, etc. Even though five content facets are shown, the IA of the present invention can have any suitable number of content facets.

Typical context facets can include a function 48 that describes an IO's contextual point of creation. The function 48 can be any suitable high-level purpose, responsibility, task or activity assigned to an accountability agenda of an organization by legislation (e.g., the *Sarbanes-Oxley Act* in the U.S. or *The Access to Information Act* in Canada), policy or mandate. Another context facet can be an activity 50, which is derived from major tasks or actions performed by the organization to accomplish sub-functions of the business process encompassing the transactions, which, in turn, produce records. The content type facet 52 refers to the IO's particular forms of content resulting from the organizational activities. The content type facet 52 aims to describe the purpose or genre of the information. Values in the context type facet 52 generally relate to the manner by which the IO's content is described such as reports, minutes, briefing notes, guidelines, etc.

Other context facets can include an organizational structure facet 54, which describes how the organizational structure that is related to the IA in question is constructed. The organizational structure facet 54 generally includes the organizational hierarchical chart. A position facet 56 reflects the positions that can be held in the organization that are commonly identified by the job titles. Since all organizations comprise positions as defined by human resources, these positions can include numerous roles, represented by a role facet 58, that need to be performed by the individual or individuals of each position. Even though seven context facets are shown, the IA of the present invention can have any suitable number of context facets.

As each role requires a specific set of activities to be completed, and each project contains various activities within it, the aforementioned project facet 46 serves as a bridge between the activities and the various content facets that fall under the project facet 46.

Figure 2:
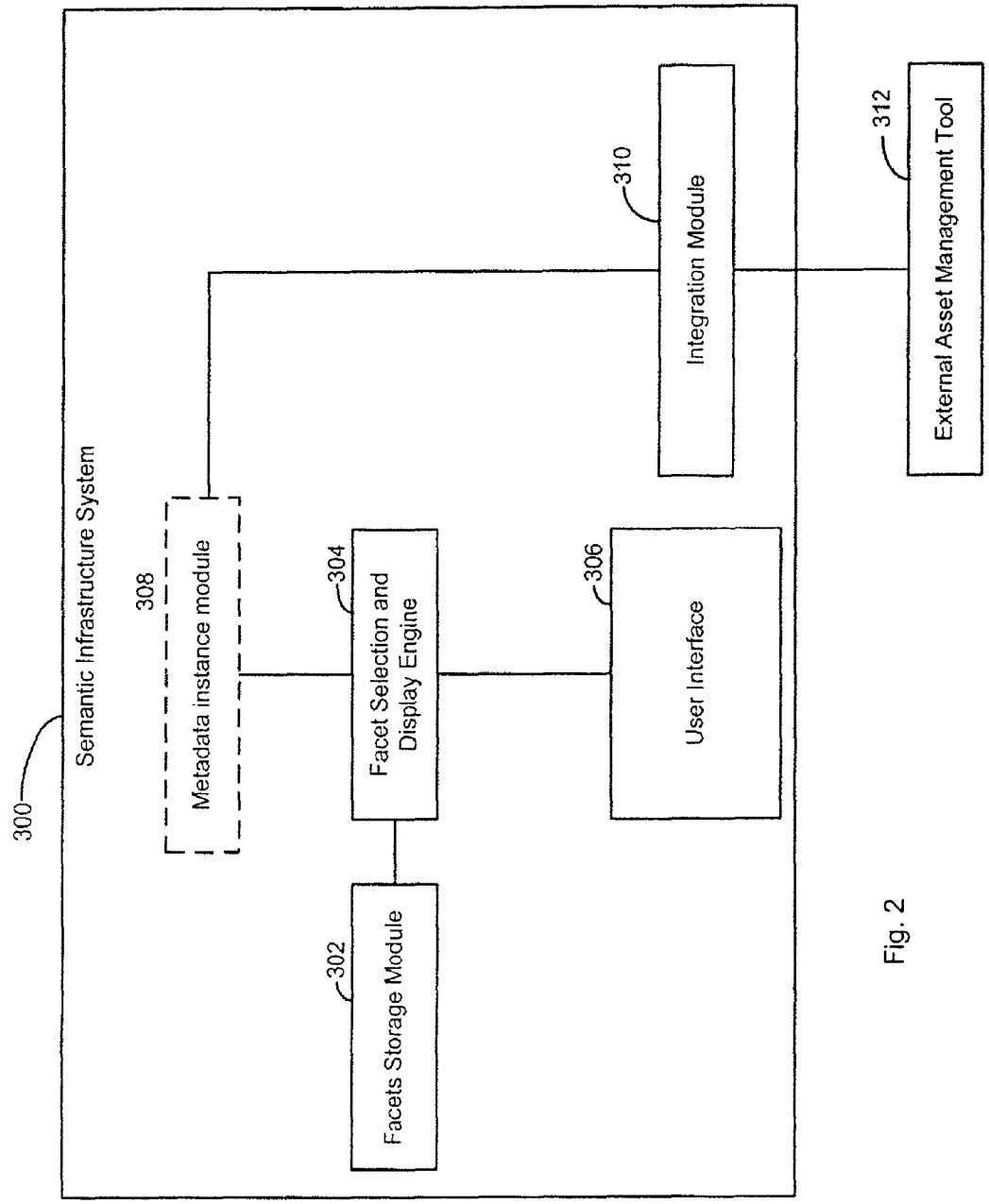
FIG. 2 shows an embodiment of a semantic infrastructure system of the present invention.

FIG. 2 shows an embodiment of a semantic infrastructure system 300 of the present invention. The system 300 is for classifying an information asset and comprises a facets storage module 302 in which a plurality of facets that can be used to describe an information asset (information object) are stored. The facets storage module 302 effectively stores facets and terms of a particular architecture. Each facet has a set of classification terms (facet values) that can be attributed to the facet in question. The facets storage module 302 is in communication with a facet selection and display engine 304, which is connected to a user interface 306. The facet selection and display engine 304 includes facet operators that define the relationships between classification terms in one facet to classification terms in another facet. The facet operators are based on preestablished valid classification term combinations (pre-established relationships). The method used in defining the pre-established valid classification term combinations is described further below. The facet selection and display engine 304 displays facets and attributable facet classification terms to the user through the user interface 306, which allows the user to select a classification term, which is received by the facet classification and display engine 304. Based on the received facet classification term and on the facet operators, the facet selection and display module 304 determines valid classification term combinations and updates the display of classification terms to the user. Further, the facet selection and display engine 304 is in communication with a metadata instance module 308, which stores the user classification term selections until the classification of the information asset is complete. Upon each facet presented to the user having one selected classification term, i.e, upon the classification of the information asset being complete, the metadata instance module 308 passes the classification terms selections to an integration module 310, which maps stored metadata instance to an externally supported metadata format, which is generated by an external asset management tool 312 (a content tool).

Figure 3:
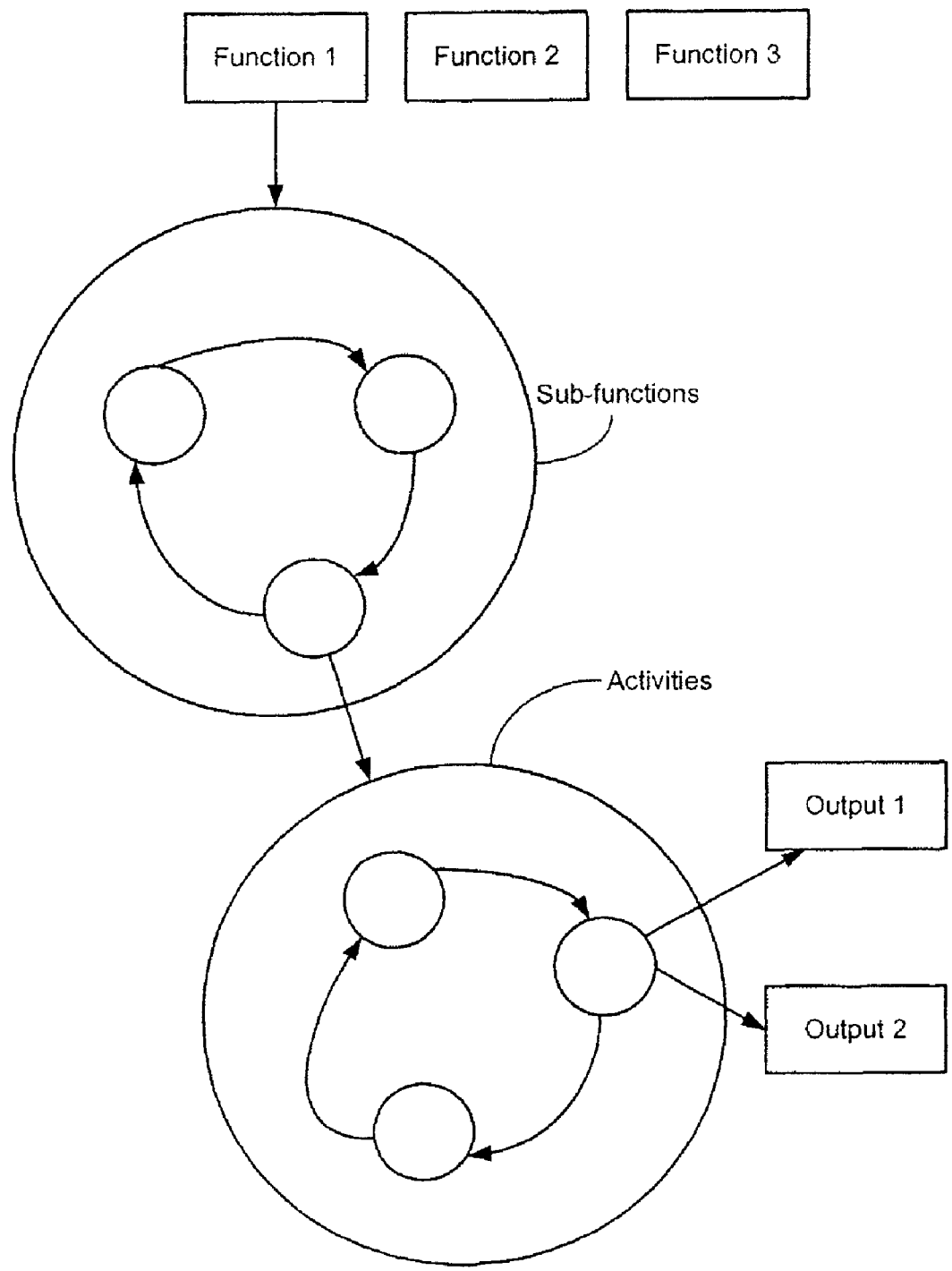
FIG. 3 shows the relationship between functions, sub-functions, activities and outputs.

The relationships between the facets of a given infrastructure architecture are derived as follows. First, a top-down analysis of the business organization in which the IA (or information object) is created and/or saved is performed to obtain a representation of relevant values (or descriptors) that pertain to the function facet 48, the activity facet 50, content type facet 52, the project facet 46, the role facet 58, the position facet 56 and the organizational structure facet 54, or any other context facet that may be relevant to the business organization in question. The top-down analysis includes a step of functional decomposition, which decomposes the business processes of the organization into distinct operational or administrative functions such as, for example, Human Resources, Communications, Finance, etc. That is, the environment in which a given IO, or information asset, is apt to be used is partitioned into distinct categories. These functions (or categories) can further be decomposed into various sub-functions and activities as depicted in FIG. 3.

The top-down analysis further includes a step of role definition. Following the functional decomposition, roles are defined throughout the organization. Roles are groups of activities that are frequently performed creating consistent and reliable patterns that can be linked to the position facet. Following this, the top-down analysis proceeds with a content type inventory. Content types are the primary formalized outputs (reports, minutes, briefing notes, guidelines, etc.) of business activities. The content type inventory identifies the names and specific formats of the IOs (information assets) while linking them to their business processes. Finally, the top-down analysis proceeds with a step of project designation. That is, with varying degrees of formality within each organization in which the IA is created and/or saved, projects are planned, with the given organizational resources required to achieve a particular identified business output. Therefore, the resulting output of the top-down analysis can provide functional models, a role and activity matrix, a project chart and a content type chart.

Following the top-down analysis, a bottom-up analysis is performed to determine the content facets. The top-down analysis includes the processes of content facet selection and taxonomy model development. Typical steps carried out during this bottom-up analysis are: (1) the gathering and assessment of relevant authoritative sources such as file plans (a file plan is a hierarchical information structure that comprises rules to assist in managing retention periods and disposition activities for records; it also allows linking information with business context and document decision making progress), taxonomies (a taxonomy is a classification scheme, often hierarchical, of information components and their interrelationships. Taxonomies are often used on web sites to help users to discover and access information. Content managers also use taxonomies to organize information assets (e.g., a corporate file plan), metadata sets; (2) the confirmation of the faceted model domain coverage and validation of the accuracy of the IA content facet list; (3) the selection, and addition (if necessary) of relevant content facets; (4) the organization of the facets within the taxonomy structures; and (5) the assessment and normalization of the facet descriptors or terms. These descriptors are the preferred terms that should be used to describe the IOs.

The bottom-up analysis delivers: (A) faceted taxonomies, which consists of both the lists and hierarchical structures of facets, sub-facets (a sub-facet is used to describe a facet that can limit its scope so that it only appears when it's relevant), and their descriptors (facet values); (B) facet descriptions that provide the specifications regarding facet semantic descriptions, purposes, linkages to the authoritative sources, forms, occurrences, obligations, facet relationships, and tagging forms; (C) metadata integration scheme to support the translation of facets into a consistent metadata set. The scheme comprises metadata description and metadata application rules (pre-determined relationships between facet values).

Finally, following the bottom-up analysis, a step of business relationship building is performed. This step identifies relations between the descriptors (facet values) in different facets. Business Process Analysis, Functional Decomposition, and workflows provide top-down input that help define the Function-Activity-Content Type relationships. The Bottom-up analysis provides the Role-Activity relationship. The Project Designation provides the content-context relationships.

Figure 4:
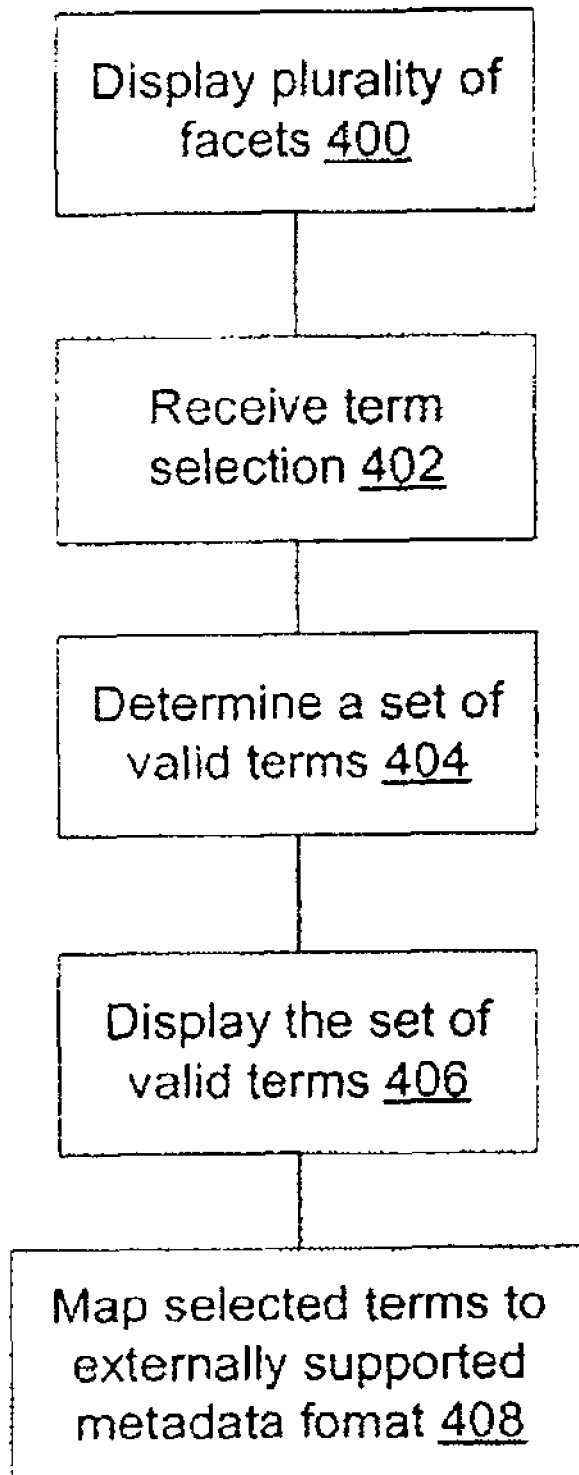
FIG. 4 shows a flowchart of a method of the present invention.

The business relationships, or other types of relationships, can be represented as operators. An operator is a collection of relationships between the terms from two or more facets. The operator specifies which terms in the other facets are valid when a term is selected in a particular facet. At present, the operators are transitive, but this may change in future systems. The operators linking related facets together are implemented by a relational algebra. It is based on the idea that some terms that are formed by combining terms from different facets (called 'compound terms') are invalid. The algebra specifies the valid compound terms in a more efficient manner by using the structure of the taxonomies to implement a validity algorithm FIG. 4 shows a flowchart of an exemplary method of the present invention directed to classifying an information asset (information object) in accordance with a semantic infrastructure. The method shown at FIG. 4 comprises a step 400 where a plurality of facets attributable to the information asset are displayed to a user through, for example, the user interface 306 of FIG. 3. Each facet displayed has a set of selectable classification terms (facet values). Following the selection of a classification term for a first facet from among a first set of classification terms associated with the first facet by the user, the facet selection and display engine 304 receives the classification at method step 403 of FIG. 4. At step 404, the facet selection and display engine 304 determines a set of valid terms associated with remaining facets based on the classification term selection for the first facet and in accordance with predefined facet relationships. Subsequent to this step, the user interface displays, at step 406 the set of valid terms for further classification term selection by the user. Finally, at step 408, mapping of selected terms to an externally supported metadata format is performed.

The method of can further comprise a step of limiting the set of valid terms to those associated with the term selection for the first facet and the further term selection. Also, the step of displaying the plurality of facets can comprise displaying the set of classification terms for each of the plurality of facets as user-selectable elements; and the user-selectable elements can be displayed in a drop-down menu. Additionally, the step of receiving the term selection can comprises a step of receiving a user selection of one of the user-selectable elements.

If a user attempting to classify an information object does not find a suitable classification term for a given facet, the user can override the valid terms displayed and be presented with all possible classification terms for all facets. In override mode, once the user has selected a complete set of terms for a plurality of facets, a new relationship for the facets and terms in question can be submitted as a candidate facet operator, for approval by an administrator. A user can also suggest new terms if appropriate relationships cannot be created based on current classification terms. The system can include an information dashboard module to perform these steps.

Furthermore, the step of receiving the term selection can comprises a step deriving the term selection based on context information, and the predefined facet relationships can be based on facet operators. Moreover, the step of displaying the set of classification terms can comprises a step of displaying classification terms in the set of valid terms; and the externally supported metadata format can supported by an external asset management tool (content tool).

The method of the present invention can be such that asset retention and disposition properties are associated with at least one selected term, and further comprise a step of automatically associating the asset retention and disposition properties with the information asset. Further, the method can comprise a step of applying a contention rule to select one of a plurality of asset retention and disposition properties associated with selected terms. Furthermore, the facets and terms can be displayed in accordance with a mapping between display terminology and underlying metadata.

As noted above, the information management system and method of the present invention can include advanced functionalities such as automated retention and disposition of IOs. FIG. 5 shows how facet terms can be linked to a retention period and a disposition code. The disposition code indicates whether, at the end of the retention period (R), the information object should be archived (A) or deleted (D). To preserve information integrity, the system logic, through the facet selection and display engine 304, can select the longer period of retention over the shorter and the action of archiving over deleting to arrive at the 'Results' as indicated. Combinations of facet values can automatically determine the appropriate period, and the results can be mapped to the retention and disposition schedule of an already existing file plan as illustrated in the 'Map' column. However, it is also possible to associate specific RD override rules into the model itself rather than use the logical outcome of the retention and disposition periods as determined by logical contention rules. In this case, the information management system and method of the present invention overrides the logical result and enter its own identifier based on criteria embedded into the pre-determined relationships of facet selection and display module 304 to make the connection to the file plan. For example, '7A' is overridden by '25A' due to specific built-in pre-determined relationships, as shown in the command section for 'func 10' in FIG. 5.

Figure 6:
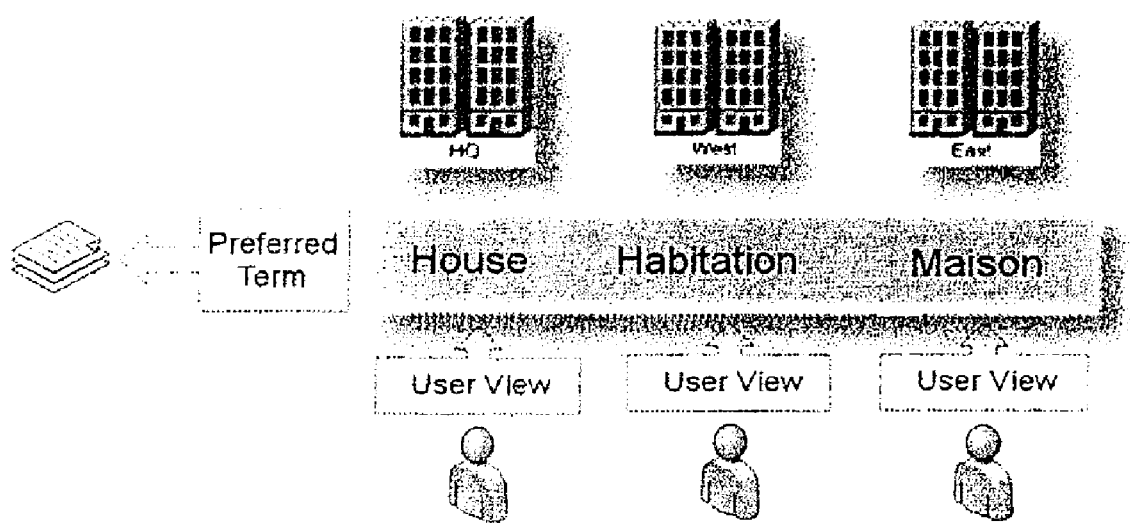
FIG. 6 shows thesaurus functionality of the information management system of the present invention.

The information management system and method of the present invention can also provide the user with term localization functionality (or thesaurus functionality) that can be used to display context/content values. The underlying metadata remains unchanged. This permits consistency to be maintained throughout the organization while still accounting for variable end-user environments. The term localization allows for users to interact with culturally, regionally, or departmentally specific vocabulary and nomenclature while still classifying information objects with the preferred organizational terminology. An example is shown at FIG. 6 where two types of localization are demonstrated. First, term variance within the same language (English) such as 'House' and 'Habitation' Additionally, there are often spelling variances within the same language due to cultural differences as in the U.S. and British words center & centre, enquire & inquire, enrolment & enrolment, organisation & organization, analyze & analyse, etc. Second, term variance due to differing languages such as the difference between English 'House' and French 'Maison'. Thus, term localization delivers a user-friendlier, customized perspective of the classification process allowing individuals to access the complete holdings of corporate information objects. The term localization functionality can be part of the rules module 28.

The information management system and method of the present invention can also be used to describe "tacit" knowledge existing within an enterprise. As individuals perform their day-to-day organizational activities, the tacit knowledge they possess is often left un-documented. Using a combination of content and context values and their related metadata, a semantic description can be created allowing to link this metadata description and individuals who may share similar knowledge. For example, as a user creates and saves a report, the system 300 generates metadata to describe the content and context of the report, which is, in fact, a semantic description of a subject within a specific context. If this user consulted two individuals to help write the report, it can be assumed that these individuals know something about the subject of the report. The user can then create a link between the semantic description created for the report and the two individuals who were consulted. As this semantic description exists external to the classified information object, the semantic description can be used to locate both information objects and tacit knowledge. The resulting knowledge map therefore provides an enhanced framework for tacit knowledge management within and throughout an organization. Additionally, the system and method of the present invention can provide a clear picture of an individual's inventory of corporate knowledge using the same semantic descriptions. As semantic descriptions refer to individuals, organizations can determine an individual employee's tacit knowledge holdings by the semantic descriptions, which refer to the specific employee. This ability becomes invaluable as it allows organizations to capture the tacit knowledge of employees before they should leave the organization.

Figure 7:
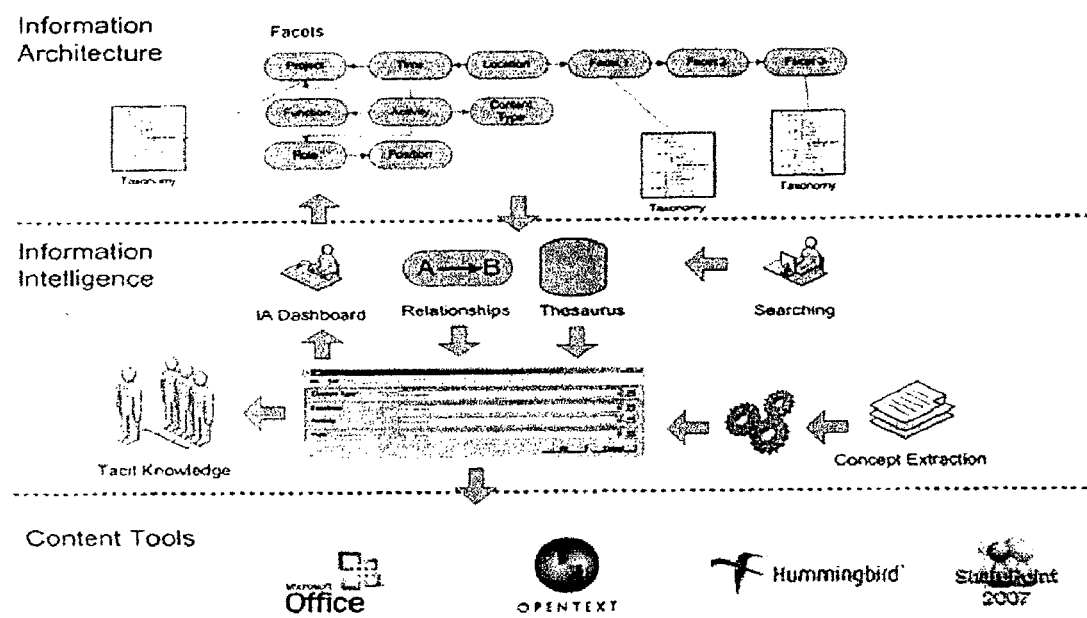
FIG. 7 shows from a high-level, how the information management system of the present invention interacts with content tools to produce faceted information attributable to an IO.

As shown at FIG. 7, once an organization's enterprise semantic information architecture model is constructed, the foundation for consistent and comprehensive information architecture is established where information management (IM) tools can cooperate effectively within the same framework. From this unified footing, the various layers of added IM functionality, such as the use of localized terms within a thesaurus and the capturing of tacit knowledge, can be implemented with in a software suite. This results in a technologically agnostic information architecture with improved abilities to describe the information objects and, as a result, an organization with better capabilities to manage the entire holdings of its information assets.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

The invention claimed is:

1. A semantic infrastructure system for classifying an information asset comprising:
a processor configured to execute:
a facet storage module storing a plurality of facets, each facet having a set of classification terms, the classification terms including associated asset retention and disposition properties;
a facet selection and display engine having facet operators representing predefined relationships between classification terms in one facet and classification terms in another facet based on established valid term combinations, the facet selection and display engine to receive term selections and to determine valid terms for display from the facet storage module for each facet based on the received term selections in accordance with the facet operators, the facet selection and display engine automatically associating the asset retention and disposition properties with the information asset in accordance with the term selection;
a metadata instance to store the term selections until asset classification is complete; and
an integration module to map the stored metadata instance to an externally supported metadata format.

2. The system of claim 1 further comprising a user interface controlled by the facet selection and display engine.

3. The system of claim 2 wherein the user interface displays the facets and terms as user-selectable elements.

4. The system of claim 1 wherein the facet storage module includes display terminology associated with underlying metadata, and wherein the facet selection and display engine displays facets and terms in accordance with a mapping between the display terminology and the underlying metadata.

5. The system of claim 1 wherein the plurality of facets includes context facets determined based on an analysis of business processes and determined independently of information asset contents.

6. The system of claim 1 wherein the facet selection and display engine includes means to apply a contention rule to select one of a plurality of asset retention and disposition properties associated with selected terms.

7. The system of claim 1 wherein the facet operators are based on term inheritance derived from inheritance in each faceted classification.

8. The system of claim 1 wherein the facet operators define bi-directional relationships between terms in one facet to terms in a plurality of other facets based on established valid term combinations.

9. The system of claim 1 wherein the facet selection and display engine iteratively determines valid terms for display from the facet storage module for each facet based on the received term selections in accordance with the facet operators.

10. The system of claim 1 further comprising a second integration module to map the stored metadata instance to a second externally supported metadata format.

11. An information asset management system comprising a processor implementing an external asset management tool interoperating with the semantic infrastructure system of claim 1.

12. A method of classifying an information asset according to a semantic infrastructure, the method comprising:
displaying a plurality of facets, each facet having a set of classification terms;
receiving a term selection for a first facet from among a first set of classification terms associated with the first facet, asset retention and disposition properties being associated with the term selection;
automatically associating the asset retention and disposition properties with the information asset;
determining a set of valid terms associated with remaining facets based on the term selection for the first facet and in accordance with predefined facet relationships;
displaying the set of valid terms for further term selection;

mapping selected terms to an externally supported metadata format.

13. The method of claim 12 further comprising limiting the set of valid terms to those associated with the term selection for the first facet and the further term selection.

14. The method of claim 12 wherein displaying the plurality of facets comprises displaying the set of classification terms for each of the plurality of facets as user-selectable elements.

15. The method of claim 14 wherein the user-selectable elements are displayed in a drop-down menu.

16. The method of claim 14 wherein receiving the term selection comprises receiving a user selection of one of the user-selectable elements.

17. The method of claim 12 wherein receiving the term selection comprises deriving the term selection based on context information.

18. The method of claim 12 wherein the predefined facet relationships are based on facet operators.

19. The method of claim 12 wherein displaying the set of classification terms comprises displaying classification terms in the set of valid terms.

20. The method of claim 12 wherein the externally supported metadata format is supported by an external asset management tool.

21. The method of claim 12 further comprising applying a contention rule to select one of a plurality of asset retention and disposition properties associated with selected terms.

22. The method of claim 12 wherein facets and terms are displayed in accordance with a mapping between display terminology and underlying metadata.

23. The method of claim 12 further comprising establishing a relationship between a person and a subject based on context facets associated with the subject to represent tacit knowledge.

24. A non-transitory computer readable medium storing statements and instructions which, when executed, cause a processor to perform the method of claim 12.

\* \* \* \* \*